United States Patent
Clear et al.

(10) Patent No.: US 6,750,261 B1
(45) Date of Patent: Jun. 15, 2004

(54) HIGH INTERNAL PHASE EMULSION FOAMS CONTAINING POLYELECTROLYTES

(75) Inventors: Susannah C. Clear, Hastings, MN (US); Ranjani V. Parthasarathy, Woodbury, MN (US); Ravi K. Sura, Woodbury, MN (US); Philip P. Soo, Fullerton, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 11 days.

(21) Appl. No.: 10/409,378

(22) Filed: Apr. 8, 2003

(51) Int. Cl.$^7$ .................................................. C08J 9/28
(52) U.S. Cl. ........................... 521/50.5; 521/64; 522/84
(58) Field of Search ..................... 521/64, 50.5; 522/84

(56) References Cited

U.S. PATENT DOCUMENTS

| | | |
|---|---|---|
| 4,473,611 A | 9/1984 | Haq |
| 4,522,953 A | 6/1985 | Barby et al. |
| 4,536,521 A | 8/1985 | Haq |
| 4,611,014 A | 9/1986 | Jomes et al. |
| 4,612,334 A | 9/1986 | Jones et al. |
| 5,352,711 A | 10/1994 | DesMarais |
| 5,405,618 A | 4/1995 | Buttery et al. |
| 5,545,676 A | 8/1996 | Palazzotto et al. |
| 5,583,162 A | 12/1996 | Li et al. |
| 5,674,561 A | 10/1997 | Dietz et al. |
| 5,691,846 A | 11/1997 | Benson, Jr. et al. |
| 5,856,366 A | 1/1999 | Shiveley et al. |
| 6,290,853 B1 | 9/2001 | Allmer et al. |
| 6,353,037 B1 * | 3/2002 | Thunhorst et al. |
| 6,395,804 B1 | 5/2002 | Rao et al. |
| 6,462,100 B1 * | 10/2002 | Thunhorst et al. |
| 2002/0128336 A1 | 9/2002 | Kolb et al. |
| 2003/0138779 A1 | 7/2003 | Parthasarathy et al. |

FOREIGN PATENT DOCUMENTS

| | | |
|---|---|---|
| GB | 1 458 203 | 12/1976 |
| WO | WO 95/33553 | 12/1995 |
| WO | WO 96/21474 | 7/1996 |
| WO | WO 98/04029 | 1/1998 |
| WO | WO 98/04458 | 2/1998 |
| WO | WO 99/09070 | 2/1999 |
| WO | WO 01/21693 A1 | 3/2001 |
| WO | WO 01/66820 A1 | 9/2001 |

OTHER PUBLICATIONS

B. C. Benicewicz et al., "Open–Celled Polymeric Foam Monoliths for Heavy Metal Separations Study", Journal of Radioanalytical and Nuclear Chemistry, (1998), pp. 31–35, vol. 235, Nos. 1–2.

A. Guypt et al., "Recent Studies Aimed at the Development of Polymer–Supported Reactants with Improved Accessibility and Capacity", Reactive Polymers, (1991/1992), pp. 233–259, vol. 16.

E. Ruckenstein et al., "Lipase Immobilized on Hydrophobic Porous Polymer Supports Prepared by Concentrated Emulsion Polymerization and Their Activity in the Hydrolysis of Triacylglycerides", Biotechnology and Bioengineering, (1993), pp. 821–826, vol. 42, John Wiley & Sons, Inc.

E. Ruckenstein et al., "Production of Lignin Peroxidase by Phanerochaete Chrysosporium Immobilized on Porous Poly(Styrene–Divinylbenzene) Carrier and Its Application to the Degrading of 2–Chlorophenol", Biotechnology and Bioengineering, (1994), pp. 79–86, vol. 44, John Wiley & Sons.

H. F. M. Schoo et al., "Immobilization of Flavin on Highly Porous Polymeric Disks: Three Routes to a Catalytically Active Membrane", Reactive Polymers, (1991/1992), pp. 125–136, vol. 16.

S.D. Alexandratos et al., "Functionalized Polymer Foams as Metal Ion Chelating Agents with Rapid Complexation Kinetics", Journal of Applied Polymer Science, (1998), pp. 1911–1916, vol. 88, John Wiley & Sons, Inc.

* cited by examiner

*Primary Examiner*—Morton Foelak
(74) *Attorney, Agent, or Firm*—Kent S. Kokko

(57) ABSTRACT

This invention relates to foams made by polymerizing high internal phase emulsions (HIPE) containing polyelectrolytes. The emulsions comprise a continuous oil phase and a co- or discontinuous aqueous phase. The resulting foams are useful as a separations medium.

19 Claims, 4 Drawing Sheets

HIGH INTERNAL PHASE EMULSION FOAMS CONTAINING POLYELECTROLYTES

TECHNICAL FIELD

This invention relates to foams made by polymerizing emulsions containing polyelectrolytes. The emulsions comprise a continuous oil phase and a co- or discontinuous aqueous phase. The resulting foams are useful as a separations medium.

BACKGROUND

Porous polymeric materials have been produced by photo- or thermal polymerization of water-in-oil emulsions, having a relatively high ratio of water to oil phases. These emulsions, known as high internal phase emulsions (HIPEs) when the water phase is 74% or more of the total by volume, comprise a polymerizable oil continuous phase and a crosslinking agent, and a co- or discontinuous aqueous phase. To achieve the most uniform morphology, such emulsions are prepared by controlled addition of the aqueous phase to the oil phase under shear conditions in the presence of the emulsifier. See for example, U.S. Pat. Nos. 4,522,953 (Barby et al.), 6,462,100 (Thunhorst et al.), 6,353,037 (Thunhorst et al.) and WO 01121693.

The resulting polymerized emulsions have a foam structure containing cavities or cells interconnected by pores in the cavity walls. By choosing the appropriate component and process conditions, HIPE polymers with void volumes of 74% to greater than 95% can be achieved. These materials have a high capacity for absorbing and retaining fluids. Modifications of HIPE polymers have been described: U.S. Pat. No. 4,536,521 (Haq) discloses that HIPE polymers may be sulfonated to produce materials that have a high capacity for absorption of ionic solutions.

SUMMARY

The present invention features a novel method for creating foams containing polyelectrolytes from water-in-oil emulsions. The foams may be made from high internal phase emulsions (HIPEs) whereby the emulsion is polymerized and crosslinked by exposure to actinic radiation, by heating, or a combination thereof.

One aspect of the present invention provides a process for making a crosslinked polymeric foam comprising: a) mixing an oil phase comprising at least one polymerizable monomer and at least one initiator, with an aqueous phase containing at least one polyelectrolyte (for example poly(sodium-4-styrenesulfonate)), to form an emulsion wherein the aqueous fluid forms a discontinuous or co-continuous phase with the continuous oil phase; b) optionally shaping the emulsion; and c) exposing the emulsion to actinic radiation or thermal energy to form a crosslinked polymeric foam containing the polyelectrolyte and residual aqueous phase. If desired, the emulsion may further comprise porous or nonporous organic or inorganic particles, including metal oxide particles, including surface-functionalized metal oxide particles.

In another aspect, the present invention provides a process for making a crosslinked polymeric foam comprising: a) mixing an oil phase comprising at least one polymerizable monomer and at least one initiator, with an aqueous phase containing at least one polymerizable monomer, having ionic or ionizable functional groups, to form an emulsion wherein the aqueous fluid forms a discontinuous or co-continuous phase with the continuous oil phase; b) optionally shaping the emulsion; and c) exposing the emulsion to actinic radiation or thermal energy to form a crosslinked polymeric foam containing the polyelectrolyte and residual aqueous phase.

In another aspect, the invention provides an open-coiled foam having polyelectrolytes dispersed within the cellular structure of the foam. The polyelectrolyte may form discrete domains within the cellular structure (i.e. may be an amorphous particle within the foam cells), or may coat the polymeric matrix of the foam (i.e. coat the walls of the foam cells). The foam may be used as a separations medium for the removal of various analytes from solution.

As used in this invention:

"HIPE" or "high internal phase emulsion" means an emulsion comprising a continuous oil phase, typically an oil phase, and a discontinuous or co-continuous phase immiscible with the oil phase, typically a water phase, wherein the aqueous phase comprises at least 74 volume percent of the emulsion;

"water-in-oil emulsion" means an emulsion containing a continuous oil phase and a discontinuous water phase; the oil and water phases may be co- continuous in some cases;

"oil phase" means the continuous phase which contains the monomer or organic reactive species that are sensitive to reactive propagating species (e.g., those having free radical or cationic centers) and can be polymerized or crosslinked;

"stable" means the composition and microstructure of the emulsion are not substantially not changing over the period required to polymerize the emulsion;

"functional group" means a chemical entity capable of undergoing a non-polymerization reaction, such as a condensation reaction;

"functionalized metal oxide particle" means a particle prepared from colloidal materials from the group of silica, zinc oxide, titania, alumina, zirconia, vanadia, chromia, iron oxide, antimony oxide, tin oxide, other colloidal metal oxides, and mixtures thereof, functionalized such that (a) the particles disperse in the oil and/or aqueous phase and (b) chemical entities attached to the particle are capable of polymerization; these particles can comprise essentially a single oxide such as silica or can comprise a core of an oxide of one type (or a core of a material) on which is deposited the oxide of another type, an aggregate, or an agglomerate of two or more oxides;

"inorganic particle" means a particle that is not comprised significantly of carbon and preferably has a longest dimension of 10 microns or less and most preferably has a longest dimension of 2 microns or less "organic particle" means a particle that is comprised significantly of carbon and preferably has a longest dimension of 10 microns or less and most preferably has a longest dimension of 2 microns or less "polyelectrolyte" means an oligomer, polymer, or copolymer containing ionic substituents wherein an aqueous solution of the oligomer or (co)polymer will conduct an electric current;

"reactive surfactant" means a surfactant (i.e., emulsifier) having sufficient reactivity to undergo polymerization reactions such that it becomes part of a polymer backbone;

"open cell" means a foam wherein the majority of adjoining cells are in open communication with each other; an open cell foam includes foams made from co-continuous emulsions in which the cell structure is not clearly defined, but there are interconnected channels creating at least one open pathway through the foam;

"window" means an intercellular opening;

"shaping" means forming into a shape and includes pouring, coating, and dispensing;

"polymerize" or "cure" are used interchangeably in this application and indicate a chemical reaction in which monomers, oligomers, polymers, functionalized metal oxide particles, or other reactive species combine, including by crosslinking, to form a chain or network;

"crosslinking" means the formation of chemical links between polymer chains;

"crosslinking agent" means a material that adds to a polymer chain a site capable of forming a link to another polymer chain;

"cationically curable monomer" means a monomer capable of undergoing polymerization in which cationic species propagate the polymerization reaction and includes monomers containing, e.g., epoxide or vinyl ether moieties;

"ethylenically unsaturated" means a monomer having a carbon—carbon double bond in its molecular structure;

"actinic radiation" means photochemically active radiation including near infrared radiation, visible light, and ultraviolet light and actinic radiation;

"void" means any open space, in a foam, such as holes, cells, and interstices.

DETAILED DESCRIPTION

Figure 1:
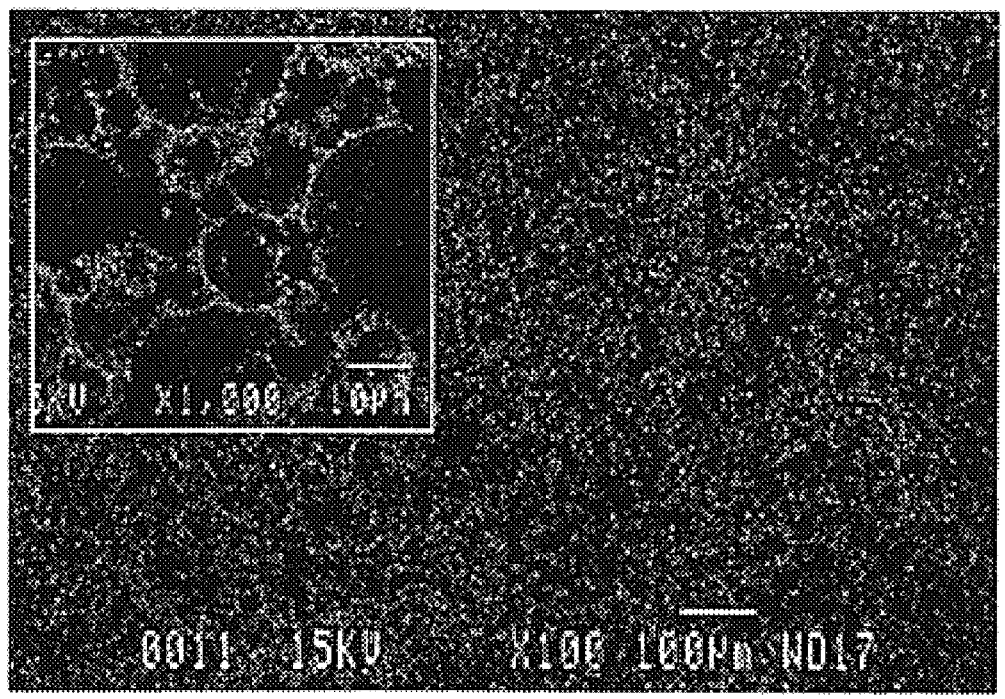
FIG. 1 is a digital image of an electron micrograph of Example 1.

The oil phase comprises one or more monomers that may be photopolymerized or thermally polymerized. Typically, the polymerizable material should be an ethylenically unsaturated substantially water-insoluble monomer. Suitable ethylenically unsaturated monomers include, for example, the ($C_1$–$C_{18}$) alkyl acrylates such as isobutyl acrylate, n-butyl acrylate, hexyl acrylate, octyl acrylate, isooctyl acrylate, 2-ethylhexyl acrylate, isobornyl acrylate, nonyl acrylate, isononyl acrylate, decyl acrylate, dodecyl (lauryl) acrylate, isodecyl acrylate, tetradecyl acrylate; aryl and alkaryl acrylates such as benzyl acrylate and nonylphenyl acrylate, the ($C_1$–$C_{18}$) alkyl methacrylates such as hexyl methacrylate, octyl methacrylate, nonyl methacrylate, isononyl methacrylate, decyl methacrylate, isodecyl methacrylate, dodecyl (lauryl) methacrylate, tetradecyl methacrylate; acrylamides such as N-octadecyl acrylamide, and other substituted acrylamides. Other ethylenically-unsaturated monomers that will copolymerize with acrylates may also be used. Suitable types of co-monomers include styrenes, maleimides, and azlactones. Such monomers are preferably substantially insoluble in water (i.e. 0.1 g/L or less), but monomers exhibiting some water solubility may be used by reducing the effective solubility through addition of a salt to the aqueous phase.

Other functionalized acrylate monomers can also be used including polyester acrylates, urethane acrylates, and acrylates of epoxidized oils. Monomers that incorporate subsequently reacting functionalized groups into the foam can also be included; such as acrylates having nucleophilic or electrophilic functional groups, or olefinically unsaturated groups.

The oil phase may also comprise multifunctional monomers and/or oligomers. These multifunctional materials may operate as both the polymerizable material and crosslinking agent because the crosslinking functionality can be introduced into the oil phase via a crosslinking site on a monomer or a separate crosslinking species. Crosslinking agents are typically present to tie polymer chains together to create a three-dimensional molecular structure. Selection of the particular type and amount of crosslinking agent will depend on the structural, mechanical, and fluid-handling properties desired in the resulting foam. Suitable crosslinking agents include monomers containing two or more ethylenically unsaturated groups such as polyfunctional acrylates, methacrylates, acrylamides, methacrylamides, and mixtures thereof. These include di-, tri-, and tetra-acrylates; as well as di-, tri-, and tetra-acrylamides; di-, tri-, and tetra- methacrylates; di-, tri-, and tetra-methacrylamides, and mixtures of these monomers. Specific examples include diethylene glycol diacrylate, trimethylol propane triacrylate, ethoxylated trimethylolpropane triacrylate, urethane acrylates, epoxy acrylates, polyester acrylates, oligomeric diacrylates.

Suitable acrylate and methacrylate crosslinking agents can be derived from diols, triols, and tetraols, that include 1,10-decanediol, 1,8-octanediol, 1,6-hexanediol; 1,4-butanediol; 1,3-butanediol; 1,4-but-2-enediol; ethylene glycol; diethylene glycol; trimethylolpropane; pentaerythritol; hydroquinone; catechol; resorcinol; triethylene glycol; polyethylene glycol; sorbitol; divinyl ethers and diepoxides; and the like.

Crosslinking agents, if present, may comprise from 1 to 20 weight % of the oil phase, preferably 5 to 15 weight %.

Emulsifiers may also be a component of the oil phase of emulsions in the present invention. The emulsifier may be the same material as the polymerizable material. Suitable emulsifiers include reactive surfactants and non-reactive surfactants. Reactive surfactants, having ethylenically-unsaturated bonds, or cationically curable bonds, can participate in the polymerization and crosslinking of the polymerizing materials in the oil phase and thereby become part of the foam structure. Reactive surfactants are typically preferred over non-reactive surfactants because they have a reduced tendency to leach out of the resulting foam article during use. This can be particularly beneficial in applications where low levels of leachants are required from the foam as in clinical bioassays. In a water-in-oil emulsion, the emulsifier preferably has a hydrophilic to lipophilic balance (HLB) of 3 to 9, usually 4 to 6, depending on the monomer (s) used.

Suitable classes of non-ionic emulsifiers for water-in-oil emulsions include polyoxyethylenated alkylphenols, polyoxyethylenated straight-chain alcohols, polyoxyethylenated polyoxypropylene glycols, polyoxyethylenated mercaptans, long-chain carboxylic acid esters, alkanolamine condensates, tertiary acetylenic glycols, polyoxyethylenated silicones, N-alkylpyrrolidones, fluorocarbon liquids, and alkylpolyglycosides. Specific emulsifiers most suited to water-in-oil emulsions include sorbitan monoleate, glycerol monoleate, polyethylene glycol dioleate, castor oil, glycerol monoricinoleate, distearyl dimethylammonium chloride, dioleyl dimethylammonium chloride, and bis-tridecyl sulphosuccinic acid (sodium salt). Cationic and anionic surfactants can also be used as emulsifiers in this invention. Mixtures of emulsifiers may also be used.

Suitable reactive emulsifiers for the water-in-oil emulsions include methoxypoly(ethyleneoxy) ethyl acrylate having 1 to 40 oxyethylene groups, alkylene polyalkoxy sulfate (MAZON SAM 211-80, BASF, Mount Olive, N.J.), and copolymerizable alkoxy surfactant (MAZON SAM-185, BASF, Mount Olive, N.J.). The emulsifiers listed at col. 20, lines 55 et seq. and col. 21–22 of U.S. Pat. No. 5,856,366 may also be used in the present invention.

Other suitable emulsifiers include surface functionalized nanoparticles. These nanoparticles are prepared from colloidal materials from the group of silica, zinc oxide, titania, alumina, zirconia, vanadia, chromia, iron oxide, antimony oxide, tin oxide, other colloidal metal oxides, and mixtures thereof, functionalized such that (a) the particles disperse in the oil and/or aqueous phase and preferably (b) chemical entities attached to the particle are capable of polymerization; these particles can comprise essentially a single oxide such as silica or can comprise a core of an oxide of one type (or a core of a material) on which is deposited the oxide of another type. Such particles are described in U.S. Pat. Nos. 6,353,037 and 6,462,100 (Thunhorst et al.) and are incorporated herein by reference. Other useful surface modified particles are described in published application US 20020128336 (Baran et al.) incorporated herein by reference.

Agitation and the type of emulsifier used can affect the microstructure of the resulting foam. Depending on the surfactant used, increased emulsion agitation results in different cell sizes and/or number of cell windows. Emulsifiers typically comprise up to 30 weight percent of the oil.

Photoinitiators can respond rapidly and efficiently to a light source with the production of radicals, cations, and other species that are capable of initiating a polymerization reaction. Preferably the photoinitiators used in the present invention absorb at wavelengths of 200 to 800 nanometers, more preferably 300 to 800 nanometers, most preferably 300 to 450 nanometers. The photoinitiator provides a convenient trigger for the polymerization reaction. If the photoinitiator is in the oil phase, suitable types of oil-soluble photoinitiators include benzyl ketals, α-hydroxyalkyl phenones, α-amino alkyl phenones, and acylphospine oxides. Specific initiators include 2,4,6-[trimethylbenzoyldiphosphine] oxide in combination with 2-hydroxy-2-methyl-1-phenylpropan-1-one (50:50 blend of the two is sold by Ciba Geigy as DAROCUR 4265); benzyl dimethyl ketal (sold by Ciba Geigy as IRGACURE 651); α-,α-dimethoxy-α-hydroxy acetophenone (sold by Ciba Geigy as DAROCUR 1173); 2-methyl-1-[4-(methyl thio) phenyl]-2-morpholino-propan-1-one (sold by Ciba Geigy as IRGACURE 907); Oligo [2-hydroxy-2-methyl-1-[4-(1-methylvinyl) phenyl] propanone] (sold as ESACURE KIP EM by Lamberti s p a); bis(2,4,6-trimethylbenzoyl)-phenylphosphineoxide (sold by Ciba Geigy as IRGACURE 819). Other suitable initiators are those disclosed in U.S. Pat. No. 5,545,676, PCT/US98/04458, and PCT/US98/04029, all of which are incorporated herein by reference.

Photoinitiators may comprise between 0.05 and 10.0, preferably between 0.2 and 10, weight percent of the oil phase. Lower amounts of photoinitiator allow light to better penetrate the emulsion, which can provide for polymerization deeper into the foam layer. However, if polymerization is done in an oxygen-containing environment, there must be enough initiator to initiate the polymerization and overcome oxygen inhibition.

Thermal initiators can be used instead of, or in addition to, photoinitiators in the emulsion systems of the present invention. Useful thermal initiators include, e.g., azo compounds, peroxides, dialkyl and diacyl peroxides, hydroperoxides, peroxydicarbonates, peroxyketals, peroxy esters, peroxycarboxylates, potassium persulfate, t-butyl peroxyisobutyrate, and 2,2'-azobisisobutyronitrile, 2,2'-azobis(2,4-dimethylpentane nitrile), and other redox-type initiators. The thermal initiator could be present in either the oil or aqueous phase, and can be included independently of the photoinitiator (in systems meant for thermal polymerization only).

The oil phase may contain inert ingredients, such as polymers that are dissolved, but do not undergo polymerization. These ingredients may add strength or toughness or other desirable properties to the polymerized foam. Suitable polymer additives include polyisoprene, polyethylene, polypropylene, polybutadiene, and acrylic tougheners. Other suitable oil phase additives include flame-retardants, fillers, $CaCO_3$, carbon black, pigments, minerals and dyes.

The oil phase may also comprise materials that can incorporate subsequently reactive functional groups into the foams during their fabrication. Many functional groups can be incorporated with vinyl-containing monomers (e.g., vinyl dimethyl azlactone) or acrylate esters or other acrylate and methacrylate groups (e.g., hydroxyethyl acrylate, acrylamide, butylmethacrylates). Reactive functional groups that may be incorporated include carboxylates, amines (including primary, secondary, tertiary, and quarternary amines and polyamines), sulfhydryls, azlactones, aldehydes, epoxides, maleimide isothiocyanates, isocyanates, hydroxy and hydroxyethyl groups, amides including (acrylamides), sulfonates, sulfonamides, phosphates, polyphosphates, iminodiacetates, various bipyridyl groups, salicylates, polyethers (including crown and cryptand ethers), and cyclodextrans.

Optionally, the oil phase may contain a miscible fluid that is not reactive with either the oil phase or aqueous phase components, and is further not a cosolvent for the two phases, (for example, a solvent that does not disrupt the emulsion, or a solvent that does not dissolve the polymerized oil phase and/or the polyelectrolyte). The addition of a non-polymerizable fluid to the oil phase can enable processing of solid monomers and/or solid emulsifiers. For example, monomers can be dissolved and allowed to polymerize as liquids dissolved in a oil phase. This strategy can also help to reduce the density of the resulting foams and may increase the internal surface area (per gram) of the resulting foam.

Suitable solvents include ethers having a water solubility of less than 0.1 g/100 mL water such as ethyl propyl ether, dipropyl ether, methyl t-butyl ether, di-t-butyl ether,); cyclic ethers; alkanes; cycloalkanes; aromatic hydrocarbon solvents such as benzene, toluene, o-xylene, m-xylene, p-xylene; halogenated hydrocarbon solvents; lactones such as valerolactones; ketones such as cyclopentanone; sulfones such as tetramethylene sulfone, 3-methylsulfolane, 2,4-dimethylsulfolane, methyl sulfone, ethyl sulfone, propyl sulfone, butyl sulfone, methyl vinyl sulfone, 2-(methylsulfonyl) ethanol, and 2,2'-sulfonyidiethanol; amides such as dimethyl acetamide; sulfoxides such as dimethylsulfoxide; cyclic carbonates such as propylcne carbonate, ethylene carbonate and vinylene carbonate; carboxylic acid esters such as ethyl acetate; and other solvents such as methylene chloride, chloroform, carbon tetrachloride and glycol sulfite, mixtures of such solvents, and supercritical solvents (such as $CO_2$). Solvents having a higher water solubility may be used provided salts are added to increase the ionic strength of the aqueous phase.

Generally, the continuous oil phase comprises from 5 to 25 wt. % of the emulsion. Generally the oil phase comprises less than 26 volume percent of the emulsion.

A polyelectrolyte is a macromolecular substance, which, on dissolving in water or another ionizing solvent, dissociates to give polyions (polycations or polyanions)-multiply charged ions—together with an equivalent amount of counterions of small charge and opposite sign. Polyelectrolytes dissociating into polycations and polyanions, with no ions of small charge, are also contemplated. A polyelectrolyte can be a polyacid, a polybase, a polysalt or a polyampholyte. The polyelectrolyte may comprise a hydrophilic homopolymer or a hydrophilic copolymer wherein the monomer comprising the homopolymer, and at least one monomer comprising the copolymer, is ionizable. Although the polyelectrolyte may contain water-insoluble segments, the polyelectrolytes are water-soluble, i.e., they will form aqueous dispersions or solutions. Alternatively, the aqueous phase may comprise a monomer having an ionized or ionizable functional group, which when polymerized, produces the polyelectrolyte.

For a water-soluble polyelectrolyte or for ionic or ionizable monomers, the ionic or ionizable groups may be cationic, anionic or both. For polyelectrolytes that contain water-insoluble segments, the ionic groups can be cationic or anionic, but typically should all have the same type of charge because the ionic water-soluble regions will organize at the interface of the droplet or particle. The like charges cause the copolymer domains to repel each other, thereby inhibiting particle flocculation. Reduction of particle flocculation is desired because flocculation can decrease emulsion stability and shelf-life. The repulsive forces can help provide emulsion stability for an extended period of time, e.g., for a time sufficient to effect subsequent polymerization of the emulsion.

The polymer chain of the polyelectrolyte may be linear or branched. The polyelectrolyte(s) comprise at least one ionizable monomeric component, such as an acid group, and are electrolytic in an aqueous medium. Examples of suitable monomeric materials that can provide electrolytic and ionizable moieties include, but are not limited to, for example, 2-acrylamido-2-methyl-1-propanesulfonic acid (AMPS), salts of sulfopropyl acrylate, maleic anhydride, itaconic anhydride, β-carboxy ethylacrylate, vinylazlactone-glycolic acid adduct, sodium styrene sulfonate, potassium acrylate, sodium acrylate, sodium methacrylate, ammonium acrylate, sodium 2-acrylamido-2-methylpropane sulfonate, 4,4,9-trimethyl-4-azonia-7-oxa-dec-9-ene-1-sulfonate, N,N-dialkyl-N-beta-methacryloxyethyl ammonium propionate betaine, trialkylamine (meth)acrylamide, 1,1-dimethyl-1-(2,3-dihydroxypropyl)amine methacrylamide, and other zwitterionic ethylenically-unsaturated monomers having the requisite solubility requirements, mixtures thereof, and the like. Preferred oil-insoluble polar monomers include those selected from the group consisting of acrylamide, sodium styrene sulfonate, sodium acrylate, sodium 2-acrylamido-2-methylpropane sulfonate, sodium methacrylate, and mixtures thereof, due to ease of formulation and desirable properties when polymerized, or combinations of these materials.

Useful co-monomers that may be used to prepare the copolymeric polyelectrolytes include any ethylenically unsaturated monomers that may be co-polymerized with the ionizable monomer, and which do not deleteriously affect the stability of the emulsion. Examples of useful comonomers include olefins, such as ethylene and propylene; vinyl monomers; vinylidene monomers; monoolefinic and polyolefinic monomers; and heterocyclic monomers. Preferred comonomers include substituted or unsubstituted ethylenically unsaturated carboxylic acids or derivatives thereof. The carboxylic acids can be mono- or poly-carboxylic acid derivatives. Useful carboxylic acid derivatives include esters, amides, nitriles, and anhydrides. Particularly preferred comonomers include, for example, alkyl acrylates having 1–4 carbon atoms (e.g., butyl acrylate).

If a polymerizable mixture is used to prepare the polyelectrolyte in situ, the aqueous phase may further comprise a water-soluble photoinitiator. Water-soluble photoinitiators useful in the present invention are photoinitiators which generate free radicals on exposure to actinic (usually ultraviolet) radiation which act as initiators for the (co) polymerization of the nionomer(s), and, when present, the (co)polymerizable surfactant. Useful water-soluble photoinitiators include, but are not limited to, those selected from the group consisting of benzophenones substituted with an ionic moiety, a hydrophilic moiety or both; thioxanthones substituted with an ionic moiety, a hydrophilic moiety or both, and 4-substituted-(2-hydroxy-2-propyl)phenyl ketones, wherein the 4-substituent is an ionic or hydrophilic moiety. Such ionic or hydrophilic moieties include, but are not limited, to those moieties selected from the group consisting of hydroxyl groups, carboxyl groups, and carboxylic acid salt groups.

Useful water-soluble benzophenones include to those selected from the group consisting of 4-trimethylaminomethyl benzophenone hydrochloride and benzophenone sodium 4-methanesulfonate. Useful water-soluble thioxanthones include those selected from the group consisting of 3-(2-hydroxy-3-trimethylaminopropoxy) thioxanthone hydrochloride, 3-(3-trimethylaminopropoxy) thioxanthone hydrochloride, thioxanthone 3-(2-ethoxysulfonic acid) sodium salt, and thioxanthone 3-(3-propoxysulfonic acid) sodium salt. Useful water-soluble phenyl ketones includethose selected from the group consisting of (2-hydroxy-2-propyl) (4-diethylene glycol phenyl) ketone, (2-hydroxy-2-propyl) (phenyl-4-butanecarboxylate) ketone, 4-(2-hydroxethoxy)phenyl-(2-propyl)ketone, and their water-soluble salts. A preferred water-soluble photoinitiator is 4-trimethylaminomethyl benzophenone hydrochloride.

The aqueous phase may comprise about 0.05 to about 1 part by weight of a water-soluble photoinitiator, when used, and preferably about 0.1 to about 1 part by weight based on 100 parts by weight of total (co)polymerizable species in the aqueous phase.

Generally, the amount of polyelectrolyte is 40% or less relative to the total weight of the dry foam after removal of the water. Preferably, the amount of electrolyte is from about 5 to 30% relative to the weight of the dry foam after removal of the water. Generally, the amount of polyelectrolyte, or polymerizable monomer having ionic or ionizable functional groups is 1 to 10 wt. % of the emulsion.

Salts in the aqueous phase can increase the stability of the emulsion by minimizing the tendency of monomers, comonomers, and crosslinkers that are primarily soluble in the oil phase to partition into the aqueous phase. Suitable salts for an aqueous phase include mono-, di-, or tri-valent inorganic salts including water-soluble halides, e.g., chlorides, nitrates, and sulfates of alkali metals and alkaline earth metals such as sodium chloride, calcium chloride, sodium sulfate, and magnesium sulfate and other salts described in U.S. Pat. No. 5,352,711. Hydratable inorganic salts may also be incorporated into the foams to increase hydrophilicity. Aqueous salt solutions may be used to treat the foams after removal of, or as part of the process of removing, a residual aqueous immiscible phase from a just-polymerized foam. If present, the salts preferably comprise less than 0.2 wt %, more preferably less than 0.1 wt % of the aqueous phase.

If desired, the emulsion can further comprise a quantity of water-dispersible organic or inorganic particles. Useful particles are generally less than 10 μm in diameter, and preferably 1 to 2 μm in diameter. Foams prepared with the addition of such particles better resist collapse upon drying, and have improved mechanical properties, such as compressive strength and tear resistance. Furthermore, porous particles increase the surface area available for separations. Such particle additives may also comprise surface functionalized additives such as those described in U.S. 6,353,037 (Thunhorst et al.), incorporated herein by reference. Advantageously, particle additives have been found to segregate at the oil/water interface when introduced in the aqueous phase, and subsequently at the surface of the foam cells, to produce a particle-laden foam where at least a portion of the surface of the particles are exposed.

Particulate additives may be obtained with a desired size distribution and used without further modification, or may be processed or synthesized to obtain a desired particle size distribution using methods known to those skilled in the art. Examples of particle size reduction methods include: high shear mixing (e.g. rotor-stator, Cowles blade mixer), media milling, ball milling, attritor milling, 3-roll milling, homogenization, or microfluidization. Particle size analysis typically is performed with light scattering methods or microscopy.

The emulsions are typically prepared under low shear conditions, i.e., methods providing gentle mixing of the continuous and dispersed phases, such as shaking, using an impeller mixer or pin mixer, and using a magnetic stir bar. High shear conditions may be achieved with, e.g, a rotor stator mixer. Properties of foams of the present invention such as cell sizes, cell size distributions, and number of windows may be influenced by the agitation methods or agitation speeds used to make the emulsions. Cell sizes will also depend on factors such as the type of monomer(s) and surfactant(s) used, and the volume ratio of aqueous phase to oil phase.

Emulsions of the present invention may be made by continuous or batch processes. Suitable apparatus for making the emulsions continuously include static mixers, rotor stator mixers, and pin mixers. Greater agitation may be achieved by increasing the speed of agitation or using apparatus designed to disperse the emulsifier more finely in the emulsion during the mixing process. Batch process emulsions may be made by mixing or shaking the combined ingredients, by hand or by machine. Greater agitation in a batch process may be achieved, by using e.g., a driven impeller mixer or a three-propeller mixing blade.

The foam microstructure may be influenced by the amount of time that elapses between preparation of the emulsion and polymerization. Typically, as more time elapses, the emulsion begins to break down, i.e., cells coalesce and/or cell walls collapse. A foam made from an aged emulsion may have larger and fewer cells than a foam made from the same emulsion but polymerized soon after the emulsion is made. Aging the emulsion may affect the size, number, and location of the interconnecting windows, which can alter the fluid uptake behavior of the resulting foam.

Adding a salt to the aqueous phase can change the cell and window structures because it forces the lipophilic or hydrophobic monomer out of the aqueous phase to the interface between the oil and water phases or into the oil phase, thereby improving emulsion stability. i.e., the emulsion resists breaking down into distinct layers of oil and aqueous phases. Salts are not needed in the present invention, but may be used. Salts are typically preferred in thermally polymerized emulsions due to the longer polymerization times required.

As mentioned above, a variety of mixing techniques can be used to make the emulsions of the present invention. For a given oil-to-aqueous phase ratio, each of these mixing techniques has the potential to produce a slightly different emulsion microstructure. The various microstructures will provide different properties in terms of pressure drop, fluid flow, tortuosity of the fluid path, surface area, etc. The ability to make many different microstructures with the same starting materials makes this process of the current invention a particularly versatile one.

After the emulsions are formed, they may be polymerized and crosslinked by exposure to actinic radiation, e.g., ultraviolet and visible radiation, or exposure to thermal energy. In some cases, removal of the aqueous phase can leave an open cell foam structure. Closed cell foams may also be made according to the present invention.

The relative amounts of aqueous and oil phase components used to form the emulsions of the present invention, among many other parameters, can be important in determining the structural, mechanical, and performance properties of the resulting polymeric foams. The aqueous phase to oil phase volume ratio can influence foam characteristics such as density, cell size, cell structure, and dimensions of windows that form the foam structure. The density and microstructure of the foam also depend on aspects of the emulsion-making process (rate of aqueous phase addition to the oil phase, agitation method, polymerization conditions etc.).

Some of the emulsions of the present invention can be rapidly photopolymerized. They may be polymerized in less than one hour, less than 10 minutes, less than 30 seconds, less than 10 seconds, or less than 1 second. This rapid polymerization allows a wide variety of compositions to be used. Because polymerization can occur quickly with the photopolymerization method of the present invention, an emulsion need only be stable for a short period of time, e.g., up to several minutes. The emulsions of the present invention may be thermally polymerized, which is typically not as rapid a process as the photopolymerization described herein. Thermal polymerization can occur within minutes of heating, or it can take as long as several hours. This longer polymerization time can allow differing foam structures to be obtained by allowing the emulsion structure to destabilize to some extent before polymerization. Emulsions can be both photopolymerized and thermally polymerized either simultaneously or sequentially.

The emulsions may be applied onto or into materials before polymerization so that the oil phase of the emulsion polymerizes in and around the material, thus incorporating the material into the foam structure. The incorporated materials can provide the foam with strength and other desirable properties. Suitable materials include porous or open-weave materials such as woven, nonwoven, fibrous, and particulate materials, including scrims. The emulsions may also be coated, and polymerized, on nonporous materials such as paper, polymer, or metal, and microstructured substrates.

For separations applications, it is useful to prepare membranes by coating and curing the emulsion on or between porous or nonporous supports. Useful shaping geometries for separations include injecting and curing the emulsion inside sample preparation card formats, multi-well plates, sample transfer vessels (e.g. pipette tips), columns, tubes, capillaries, or microfluidic channels or wells. These structures can be surface-treated to improve adhesion of the emulsion to the support geometry. Examples of surface treatment include, but are not limited to, oxidation, ozonation, sulfonation, amination, plasma treatment, corona treatment, flame treatment, $SiO_2$ deposition, followed by acid or base treatment, chemical oxidation (such as permanganate) and silanization. One particularly useful surface treatment is the deposition of a diamond-like glass film, followed by oxygen plasma treatment, such as described in Applicant's copending application U.S. Ser. No. 09/519449, incorporated herein by reference, (published as WO 2001/66820).

Surfaces of the support also can be treated with compounds having a surface reactive functional group and a functional group capable of covalently binding to the emulsion. Surface reactive functional groups include, for example, silane-, carboxylic acid- or phosphonic acid-containing compounds that also contains a reactive functional group, such as an unsaturated group that can covalently react or polymerize with the monomers of the oil phase. Preferably, the compound would be an organosilane containing acrylate or methacrylate groups (e.g. (meth) acryloxypropyltrimethoxysilane). This silane compound may be grafted from dilute (<2%) solution, and at a pH of ~4.5–5.5. After exposure, the surface may be washed, dried and the HIPE is coated onto the surface and UV-cured.

Light in the visible and/or ultra-violet range (200 to about 800 nm) preferably is used when the emulsions of the present invention are photopolymerized. Due to the tendency of emulsions to scatter light, it is preferable to use long wavelengths in this range because they are better able to penetrate the emulsions. The photoinitiators used should be able to absorb at least some of the wavelength(s) of the light source used. The photopolymerization process of the present invention allows the production of emulsions and foams without thermal initiators or thermal initiator residue. However, for some,emulsions, it may be desirable to conduct thermal polymerization or a combination of photo and thermal polymerizations. Thermal polymerization is convenient for emulsions containing particles, polymers, metals, scrims, pigments, dyes and other components, which could interfere with the photopolymerization reaction or light absorption. Extremely thick sections of foam can be polymerized more easily thermally. Optionally, the emulsion may be polymerized by e-beam instead of polymerization with a photoinitiation.

After the emulsion has been polymerized, the aqueous phase fluid will typically still be present in the resulting foam. This residual aqueous fluid may be removed by drying the foam structure. Suitable drying methods include, e.g., vacuum drying, freeze drying, squeeze drying, microwave drying, drying in a thermal or convection oven, drying with infrared lights, air displacement, or a combination of these techniques. Such techniques should not remove the polyelectrolyte from the pores of the foam.

Foam cells, and especially cells formed by polymerizing a monomer-containing oil phase that surrounds a relatively monomer-free aqueous phase droplet (and polyelectrolyte), tend to be substantially spherical in shape. Cell sizes typically range from 1 to 200 $\mu$m and are preferably less than 100 $\mu$m. The HIPE foams may have greater than 0 to more than 100 intercellular windows per foam cell. The windows preferably have diameters of 0.1 to 25 $\mu$m, more preferably 0.1 to 10 $\mu$m. Closed cell foams and foams that have a predominately closed-cell character will either not have interconnections or windows between the foam cells, or may have very few and small interconnections.

Foam materials of the present invention having two major parallel surfaces may be from 0.05 to 10 millimeters thick, preferably 8 mm or less for successful photopolymerization. When photopolymerization is used the emulsions should not be made into a shape or thickness that prevents actinic radiation from penetrating at least halfway through it (so the emulsion can be fully polymerized by exposing each side). The allowable thickness will depend on the materials used, the nature of the polymerizing actinic radiation, the photoinitiator type, and the amount of photoinitiator used. Decreasing the amount of photoinitiator can decrease the light absorption of the emulsion and may increase light penetration, depending on the light scattering effects of the emulsion. If scattering effects dominate, reducing the photoinitiator level will have little effect on light penetration. Foams thicker than 8 to 10 mm could be made by photopolymerizing a sequence of layers, with each new emulsion layer being placed on the previously polymerized layers and being of a thickness that would allow light to penetrate through its entire depth.

This sequential polymerization approach also is useful for separations applications. Emulsions having different polyelectrolyte, oil phase, water phase, particulate, agitation, surfactant, aging or initiator conditions can be layered and polymerized sequentially to effect a separations pathway with desirable chemistry, tortuosity, surface area or flow characteristics. Examples include a multi-component separator, a pH gradient, an asymmetric membrane, and a hydrophilic/hydrophobic gradient.

If the emulsions are thermally polymerized, or polymerized with a combination of photo and thermal methods, very thick samples, e.g., several inches can be obtained because the thermal energy can penetrate the entire sample.

The foams may be made into sheets, slabs, cylinders and other shapes. The thickness of an article can vary and may depend on process conditions such as the composition, type of polymerization and initiator type and amount. If desired, the emulsion may be placed in a cylindrical column and polymerized (as described herein) to produce a chromatography column.

Layered articles may be made by photopolymerization by layering the emulsion with other polymerizable or non-polymerizable materials so long as the materials used are sufficiently transparent to the wavelength absorbed by the photoinitiator in the emulsion, or so long as the foam comprises an outer layer of a structure such that the emulsion can be fully penetrated by a sufficient amount of the radiation at the wavelength being used. The individual layers may advantageously provide different polyelectrolytes, having different functionalities, to achieve sequential separations. For thermally polymerized articles, light absorption and transparency of layers is not a limiting factor. Post-production processes such as laminating may also make multilayer articles. The layered articles may have a myriad of different properties depending on the composition, bulk density, cell sizes, window sizes, etc. of the foams.

Multi-regional articles may be made by a number of methods. They may be made by adding pieces of polymerized foam to an emulsion that is subsequently cured. They may also be made by carefully mixing two or more emulsions prior to curing. The different regions or areas in the resulting foam article may differ with respect to composition, density, color, or other properties.

When used for aqueous fluid absorption or transport, preferred polymeric foams are sufficiently hydrophilic to permit the foam to absorb aqueous fluids. The level of hydrophilicity can depend on the starting material(s). Post-production processes known in the art may also modify hydrophilicity. Post-production examples include coating with solutions of hydrophilic polymers or copolymers, coating with solutions or emulsions of copolymers having hydrophilic blocks, treatment with oxygen plasma, wet-chemical reactive methods (e.g. oxidation, sulfonation), or subsequent reactions with unreacted functional or polymerizable groups at the surfaces of the foam.

The foams of the present invention can be hydrophilic and may provide desirable fluid handling properties such as good wicking and fluid distribution characteristics. These characteristics help vertical wicking, i.e., fluid wicking in a direction primarily normal to a major surface of the foam article. This is a desirable performance attribute for many absorbent foams because any imbibed fluid may be quickly moved away from the impingement zone. Foam articles that provide vertical wicking allow absorbed fluid to be moved from the foam surface to deeper within the absorbent core of the article. These characteristics help transport imbibed fluid away from the initial impingement zone and into the unused balance of the foam structure, which allows subsequent fluid flows to the initial impingement zone to be accommodated. The foams can also have a relatively high storage capacity as well as a relatively high fluid capacity under load, i.e., under compressive load. The instant foams may also be useful in concentration of sample solutions through absorbent wicking.

The fluid handling properties of a foam can be related to the foam's capillary structure. Foams having larger cell and window sizes tend to acquire fluid quickly but do not distribute fluid sufficiently against the force of gravity, nor do they store fluid effectively. Conversely, foams having smaller cell and window sizes are able to wick fluid against the force of gravity and store the fluid tightly, but are typically slower to acquire fluid.

Foams of the invention having different absorption characteristics may be layered to produce an absorbent article having layers of foams suited for fluid acquisition and distribution alternating with layers of foams that are suited for fluid storage.

In addition, shaping and curing the emulsion while in contact with a microstructured surface can produce patterned foam articles. After curing, the foam is separated from the microstructured surface and the foam retains the geometrical pattern of the surface. These conventional techniques are described in U.S. Pat. No. 5,691,846, incorporated by reference. The microstructured surface can be chosen from a wide variety of geometrical shapes that include cavities, channels, posts, or profiles. The pattern can be selected depending on the desired use of the foam.

Some foams of the present invention may be suitable for use as filters. Open-celled foams can allow fluids (including air and liquids) to pass through, while the cells and windows can trap particles. The optimum foam structure of an open-celled foam. including cell sizes and number of windows, will depend on the fluid being filtered and the size of the particles to be removed and whether or not the fluids contain dissolved or soluble species that can interact with the foam.

An advantage of in situ incorporation of the polyelectrolyte and/or organic or inorganic particles into the HIPE foam over post-production surface functionalization of the HIPE foam is that under appropriate conditions, it is possible to fully functionalize the interior surfaces of the foam. This can minimize or eliminate exposed areas of the underlying hydrophobic matrix, if it is desirable to do so to reduce non-specific binding in separations applications.

The foams of the present invention are particularly suitable as separations media, whereby components of a solution are separated by one or more of the following methods: an ion-exchange mechanism characterized by differential affinity of the components for the polyelectrolyte and/or organic or inorganic particle additives (if any), a mixed-mode approach characterized by differential affinity of the components for the polyelectrolytes and absorptive, hydrophobic ligand-functionalized domains on dispersed particles or immobilized polyelectrolytes that depend on the solvent, pH and ionic strength characteristics of the mobile phase, or a mixed- mode approach where size exclusion plays an important role due to differential diffusion constants of the components in a polyelectrolyte layer within the foam. Differential affinities may occur as a result of ionic, hydrophobic, or affinity (e.g. antibody-antigen) interactions between analytes in the sample and the components of the foam. The foam structure is uniquely suited for such separations as the open cell foam provides channels for liquid flow into the foam matrix and contact with the polyelectrolyte and/or organic or inorganic particle additives. Samples may also be concentrated, without separation, for subsequent processing.

The open cell structure of the foam may enhance separations and sorption/desorption kinetics. The open cell structure allows mass transport through the matrix to be mainly convective over the interior surface of the cells and polyelectrolyte component, thus minimizing diffusion. In contrast, ion exchange, reverse phase and affinity chromatography resins have most of the surface area available for solute sorption mainly in the pores where the liquid medium is essentially stagnant, so that diffusion is the dominant mass transport mechanism. Diffusion is the slow step that causes the elution curves to broaden and overlap, reducing the efficiency of separations.

The foams of the present invention have additional advantages when compared to resin or silica chromatographic packing materials, or conventional membranes. When cured in place, the HIPE-based foams minimize or eliminate channeling and surface area variations due to column packing non-uniformities. The incorporation of nanoparticles, results in a high surface area available for absorption despite using relatively little mass of particulate adsorbent. This structure results in minimal or negligible shedding of particles, thereby eliminating the need for a frit. Pore dimensions within a HIPE-based foam enable convective mass transport leading to low-pressure drops across a membrane or volume of HIPE foam. The foams of the present invention also have advantages when compared to membrane technologies. Selective media may be prepared with less waste than membrane materials. Additionally, fewer components (e.g. friction fit rings, o-rings, other mechanical seals) are necessary for assembly into devices.

In ion exchange chromatography, the components of a mixture are separated on the basis of differences in net charge through the reversible binding of charged species. The strength of this binding is governed by the charge distribution on the species to be separated, the pKa of the ion exchange matrix, and the aqueous solution properties: pH and ionic strength. Separations media that separate cations (e.g. cation exchange membranes) are characterized by the presence of negatively charged groups. Separations media that separate anions (e.g. anion exchange membranes) are characterized by the presence of positively charged groups. For example, a component of a mixture that binds to an anion exchange membrane is typically released from the membrane by increasing the pH of the eluting solution or by adding anions that compete for binding to the positively charged groups. Such a component will elute from the separations medium before those components having a higher net negative charge and after those components having a lower net negative charge.

Ion exchange media can be prepared in both strong and weak forms by appropriate selection of surface chemistry, thereby providing four classes of media: strong cation, weak cation, weak anion, and strong anion. Cation-exchange media can be produced from foams by providing acidic groups on the polyelectrolyte. Suitable groups include the strongly acidic sulfonate group as well as the weakly acidic carboxylate, carboxymethyl, phosphate, sulfomethyl, sulfoethyl, and sulfopropyl groups. Anion-exchange media can be produced from foams by functionalizing the polyelectrolyte with basic groups ranging from the strongly basic quaternary ammoniums to weakly basic groups such as the aminoethyl, diethyaminoethyl, guanidoethyl, and epichlorohydrintriethanolamine groups. This assortment of matrices permits exploitation of the pKa of electrolytes or the isoelectric point, (pI), of polyampholytes in separation of charged species. With appropriate buffer conditions and media selection, it also is possible to distinguish localized charge differences in polyampholytes with the same pI.

This invention envisions the use of HIPE-based foams as ion-exchange media for separation of biological materials and removal of radionucleides, salts, metals, acids, or metal ions such as calcium or magnesium ions from aqueous solutions, and other applications of ion-exchange media known to those skilled in the art. Biological separations include protein purification, antibody isolation, peptide fractionation and oligonucleotide separation and purification. Samples containing proteins, peptides, or antibodies are loaded under low ionic strength conditions and bound material is eluted using either a step or gradient elution of buffer with higher ionic strength. Generally, a polyampholytic molecule such as a protein, antibody or peptide will bind to cation exchange media if the buffer pH is lower than the isoelectric point (pI) of the molecule, and will bind to anion exchange media if the pH is higher than the pI. Oligonucleotides are negatively charged, so they can be purified or separated with anion-exchange media (e.g. diethylaminoethyl-functional foams). If desired, the foam matrix may be blocked prior to use to retard nonspecific interactions, such as with nonionic surfactants or bovine serum albumin.

Removal of radionucleides and metals may be achieved with HMPE-based foams through several means, depending on the complexation state of the metal ions in solution. Radionucleides arid other metal ions can react with complexing anions and surfactants in an aqueous solution, and may be hydrolyzed under weak acid, neutral or basic conditions. The following species may form in aqueous solution: hydrated complexes, complexes with the complexing anion, mononuclear hydroxocomplexes, polynuclear hydroxocomplexes, particles of colloidal size, and mixed ligands complexes. Selection of an appropriate functionalization of a HIPE-based foam for removal of a particular ion is governed by pH, concentration and presence of complexing anions. Alternatively, polyelectrolytes containing chelating moieties (e.g. EDTA, iminodiacetic acid, amine chemistries) may be incorporated into the foam.

Removal of acids may be performed with anion-exchange HIPE-based foams that act as an immobilized base. Water softening, or the removal of calcium and magnesium ions, and the removal of salts from organic solutions may be achieved through the use of cation-exchange HIPE-based foams.

In some cases, ion-exchange separation alone is not sufficient for separation of a specific chemical entity, particularly if the sample contains polyampholytes with similar pI values, or if the eluted component of interest must be desalted after separation in preparation for a subsequent processing or analysis step. Additional flexibility may be gained through a mixed-mode separation approach, where ion-exchange is combined with a separation method based on affinity or hydrophobic interactions. Affinity media has ligands that will bind specific analytes from a complex sample. Examples of these ligands include nickel, which binds polyhistidine-tagged proteins, substrates for enzymes, and antigens that are capable of binding specific antibodies. Bound analytes are eluted under conditions that favor dissociation of the bond with the ligand. Hydrophobic interaction chromatography is performed with a weakly hydrophobic media, and polyampholytes are bound to the hydrophobic surface at high salt concentrations followed by elution over a decreasing salt gradient. Reverse phase chromatography is performed with very hydrophobic media, and polyampholytes are bound to the hydrophobic surfaces at any concentration of salt followed by washing and elution with organic solvents.

The foams of the present invention are modified easily to accommodate any of these methods in conjunction with ion-exchange characteristics. Hydrophobic characteristics can be imparted by incorporation of C8–C18 acrylates into the oil phase, functionalization of the cell walls via incorporation of dispersible particles with moderate hydrophobicity into the water phase (possibly coated with a surfactant to aid dispersion), or functionalization via hydrophobic domains in the polyelectrolyte homopolymer or copolymer. Affinity characteristics can be imparted by incorporation of specific ligands into the oil or water phase (see, for example U.S. Pat. No. 5,405,618 (Buttery et al.), incorporated herein by reference), introduction of ligand moieties in the surfactant, or functionalization of the interface with particles coated with the appropriate ligand chemistry that are dispersible in the water phase.

This invention envisions HIPE-based foams for mixed-mode separations for the following applications, as well as other mixed-mode separations known to those skilled in the art: removal of restriction enzymes from double-stranded DNA after polymerase chain reaction, separation of pharmaceutical compounds, separation of anionic and neutral compounds on the same media, separation of cationic and neutral compounds on the same media, capillary electrochromatography, and solid phase extraction-based separation of charged and uncharged species on the same media.

A third mechanism for separation is one where the polyelectrolyte acts as a diffusion barrier to control how quickly charged species transport through the polyelectrolyte to an underlying adsorbent material as a function of charge interactions, hydrophobic interactions and steric hindrance. This concept is analogous to size exclusion based gel filtration, where high molecular weight species elute from the media before low molecular weight species because high molecular weight species are largely excluded from a porous polymeric media and the low molecular weight species are able to diffuse into the porous material. In the foams of the invention, high molecular weight species of the same charge as the polyelectrolyte are largely excluded from the polyelectrolyte. Despite electrostatic repulsion from the like-charged polyelectrolyte, low molecular weight species are able to penetrate through the void volume of the polyelectrolyte to an adsorbent surface embedded in or buried beneath the polyelectrolyte. The low molecular weight species get trapped and do not elute from the media, provided the separation is performed at conditions suitable (e.g. foam thickness, flow rate, temperature, concentration) for all of the low molecular weight species to encounter the polyelectrolyte. Steric effects, electrostatic repulsion, local hydrophilicity and void volume of the polyelectrolyte as a function of pH, ionic strength and temperature will determine the separation between low and high molecular weight species in the same sample.

Applications of HIPE-based foams for separations based on the third mechanism include removal of big dye terminators (including dye-labeled dideoxynucleotide triphosphate ddNTP's as well as its degradation products, diphosphates, monophosphates, and nucleosides) from DNA sequencing ladders produced in a Sanger reaction as well as dNTP's (deoxynucleotide triphosphates) and primers from amplified DNA after a Polymerase Chain Reaction (PCR). This is described in U.S. patent application Ser. No. 101027,222 filed on Dec. 20, 2001, and entitled METHODS AND DEVICES FOR REMOVAL OF ORGANIC MOLECULES FROM BIOLOGICAL MIXTURES USING ANION EXCHANGE.

As is well known, PCR allows for analysis of extremely small amounts of nucleic acid (e.g., DNA). Briefly, a nucleic acid molecule (e.g., DNA template) is repeatedly synthesized using a polymerase enzyme (such as Taq DNA polymerase), an excess of two oligonucleotide primers (capable of flanking the region to be amplified and acting as a point of initiation of synthesis when placed under conditions in which synthesis of a primer extension product that is complementary to a target nucleic acid strand is induced), and free deoxynucleotide triphosphates (dNTPs, e.g., dGTP, dATP, dCTP and dTTP), which results in the amplification of a particular sequence by a millionfold or more. The resultant extension or amplification products are typically referred to as "PCR products" or "PCR amplicons."

The common PCR reaction product can then be used in a variety of molecular biological applications, including, for example, sequencing, cloning, genotyping, and forensic applications.

In fluorescence-based DNA sequencing applications, unincorporated dye terminators (i.e., dye-labeled dideoxy terminators such as dideoxynucleotide triphosphates (ddNTPs)) should preferably be removed from the reaction mixture prior to analysis of the DNA sequence fragments. Failure to sufficiently reduce the concentration of dye terminator molecules leads to dye artifacts (i.e., other dye-containing molecules such as dye-labeled dideoxy terminators such as dideoxynucleotide diphosphates (ddNDPs), dideoxynucleotide monophosphates (ddNMPs), and dideoxynucleosides) that can significantly obscure DNA sequence information. Sequencing reaction purification is a desired step in the preparation of samples prior to sequence analysis.

Conventionally, after completion of the PCR or cycle sequencing reaction, the product is generally purified by either alcohol (ethanol or isopropanol) precipitation or gel filtration chromatography. Other protocols using polyalkylene glycol and biotin-streptavidin interactions have also been utilized for sequencing reaction purification. Ultrafiltration membranes, phenol/chloroform extraction, and enzymatic treatments are other methods that are commonly used for purification of PCR and sequencing reaction mixtures.

Thus, the present invention provides a method for separation that comprises contacting a solution having at least analyte with a porous, crosslinked foam having a polyelectrolyte dispersed therein.

EXAMPLES

Example 1

Example 1 describes a batch process for making a HIPE foam of the present invention. Prior to preparing the emulsion, a polyelectrolyte-coated alumina was prepared by mixing alumina (0.5–1.0 µm Baikalox) into a 1% by weight solution of poly(sodium 4-styrenesulfonate) (PSSA) in water. The mixture was allowed to sit overnight and was then centrifuged and washed four times to remove any excess PSSA. A dispersion of the coated alumina particles in deionized water was then prepared at 20% by weight solids at a pH of 5.

The continuous oil phase of the emulsion consisted of 6.67 g 2-ethylhexylacrylate (2-EHA, Aldrich Chemical Co., Milwaukee, Wis.), 1.03 g isobornyl acrylate (IBOA, Sartomer Co., Exton, Pa.), 1.03 g trimethylolpropane triacrylate (TMPTA, Sartomer Co.), 1.37 g sorbitan monooleate (SMO, Aldrich Chemical Co.), and 0.16 g Darocur 4265 (Ciba Specialty Chemicals, Hawthorne, N.Y.). The oil phase was mixed at 500 rpm with a rectangular impeller as 65 g of the dispersion of PSSA-coated alumina was added dropwise at a rate of about one drop per second to produce a stiff water-in-oil emulsion. The emulsion was then pressed between two quartz plates with a shim to maintain a thickness of approximately 0.15 cm. The emulsion was then polymerized by passing it under an ultraviolet Fusion (Gaithersburg, Md.) F600 Irradiator lamp equipped with a D bulb operating at 100% power at the focal point which was approximately 5 cm below the lamp housing. The lamp was oriented vertically such that the sample was irradiated at the focal point. The sample was cured by passing it under the lamp three times on each side at a line speed of 9.1 meter/min. After the emulsion was cured, it was transferred onto a silicone-coated release liner and put into a forced-air oven at 65° C overnight to dry. FIG. 1 shows a scanning electron microscopy (SEM) micrograph taken of the cross-section of the foam.

Example 2

A HIPE foam was prepared as in Example 1 except the alumina particles were functionalized with the quarternary ammonium-containing polyelectrolyte, poly (diallylmethylammonium chloride), PDMAc (40 wt % in water, Aldrich Chemical Co.). The alumina dispersion was prepared with 0.089 grams of the polyelectrolyte, 28.49 grams of water and 3.42 grams of alumina. The mixture of alumina and water was agitated for 2 minutes with a sonic horn to produce the dispersion. The indicated amount of polyelectrolyte was added and the mixture was shaken for three hours followed by centrifuging. The supernatant was removed and an equal amount of deionized water was added before resuspending the alumina. This suspension was then diluted with deionized water by a factor of 5.5. 32 grams of the suspension was added to 5.13 grams of the oil phase described in Example 1. After curing and drying, the HIPE foam was 0.125% by weight PDMAc and 7.3% by weight alumina.

Example 3

A HIPE foam was prepared as in Example 2 except the alumina dispersion was prepared with 0.36 grams of the polyelectrolyte, 28.2 grams of water and 3.4 grams of alumina.

Example 4

A HIPE foam was prepared as in Example 2 except the alumina dispersion was prepared with 0.179 grams of the polyelectrolyte, 28.4 grams of water and 3.42 grams of alumina.

Example 5

A HIPE foam was prepared as in Example 2 except the alumina particles were coated with the ionic species, n-trimethoxysilylpropyl n,n,n-trimethylammonium chloride (50 wt % in water, Gelest Inc., Morrisville, Pa.), that polymerized on the surfaces of the alumina. A dispersion was prepared with 0.1474 grams of the ionic species, 28.43 grams of water and 3.42 grams of alumina.

To demonstrate the binding properties of the foam, the foam was placed into a 4 mm diameter column fitted with a retainer ring on top and a Porex frit (Porex Corp., Fairbum, Ga.) at the bottom for support. 10 microliters of a quarter-strength sequencing reaction mixture was prepared using 2 microliters of BIGDYE mix (a proprietary mix of dye terminators, Taq polymerase enzyme, dNTP's and buffer, BIGDYE Terminator v 2.0, Applied Biosystems Inc., Foster City, Calif.), 200 nanograms of DNA template (PGEM 3Z f+, Promega Corp. Madison, Wis.) and 1.6 picomoles of a primer (M13 forward primer, −20). The mixture was thermocycled according to the manufacturer's instructions in a GENEAMP PCR System 9700 thermocycler (Applied Biosystems, Inc). 5 microliters of the unpurified quarter-strength sequencing reaction mixture (containing dye terminators and their hydrolysis products, DNA template, Taq polymerase, buffer, dNTP's and primer) was centrifuged through the foam at 6000 RPM for 2 minutes. The purified reactions were removed from the column and diluted with 15 microliters of distilled water followed by capillary electrophoresis analysis.

Capillary electrophoresis analysis of the sequencing reactions was done with a Beckman P/ACE MDQ Capillary Electrophoresis instrument (Beckman Coulter, Fullerton, Calif.) with a fluorescence detector (488 nanometer excitation, 530 to 700 nanometer emission) using a 75 micrometer ID, 30 cm long (20 cm to the detector) fused silica capillary. Runs were performed at 500 volts per centimeter (15 kV total) using 50 millimolar tris-HCl/1 millimolar EDTA (pH 8.5) as the running buffer. Sample injection was done at 690 pascals for 5 seconds. The conditions used gave good separation of the dye terminators (all of the four ddNTPs corresponding to the four bases, A, T, G, C as one peak with a retention time of 3.2 minutes) and its degradation products (as one peak with a retention time of 2.2 minutes) and the combined sequencing ladder (as one peak with a retention time of 4.1 minutes). Sequencing ladder and dye terminator concentrations were obtained by integrating the peak area of the various analytes. For each of the samples, the baseline was subtracted from the analyte values and the resulting analyte concentration was represented as a percentage of the starting sequencing reaction. The analysis showed that the concentration of the dye terminators, their degradation products, and DNA content, was brought down to less than 2% of the original starting concentration.

Example 6

Figure 2:
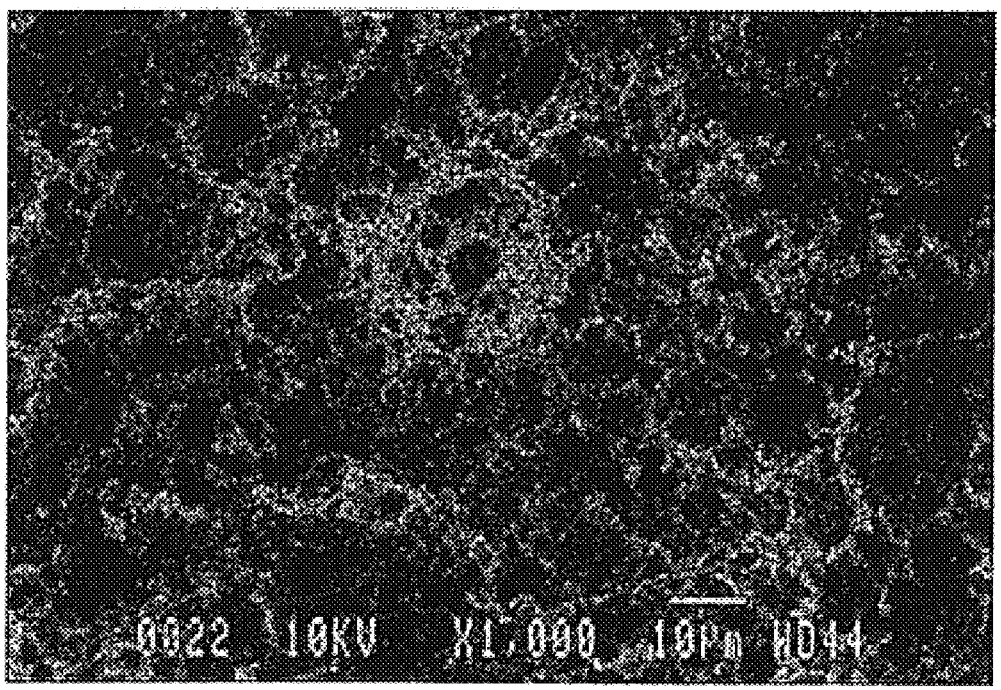
FIG. 2 is a digital image of an electron micrograph of Example 6.

A HIPE foam was prepared as in Example 1 except the alumina dispersion was replaced with a dispersion of polystyrene latex spheres. 32 grams of an aqueous dispersion containing 0.35 grams of polystyrene latex spheres (0.1–1.0 μm, Polysciences, Warrington, Pa.) was prepared and added to 5.13 grams of the oil phase described in Example 1. After curing and drying, the HIPE foam was 6.4% by weight polystyrene. FIG. 2 shows a SEM micrograph taken of the cross-section of the foam.

Example 7

Figure 3:
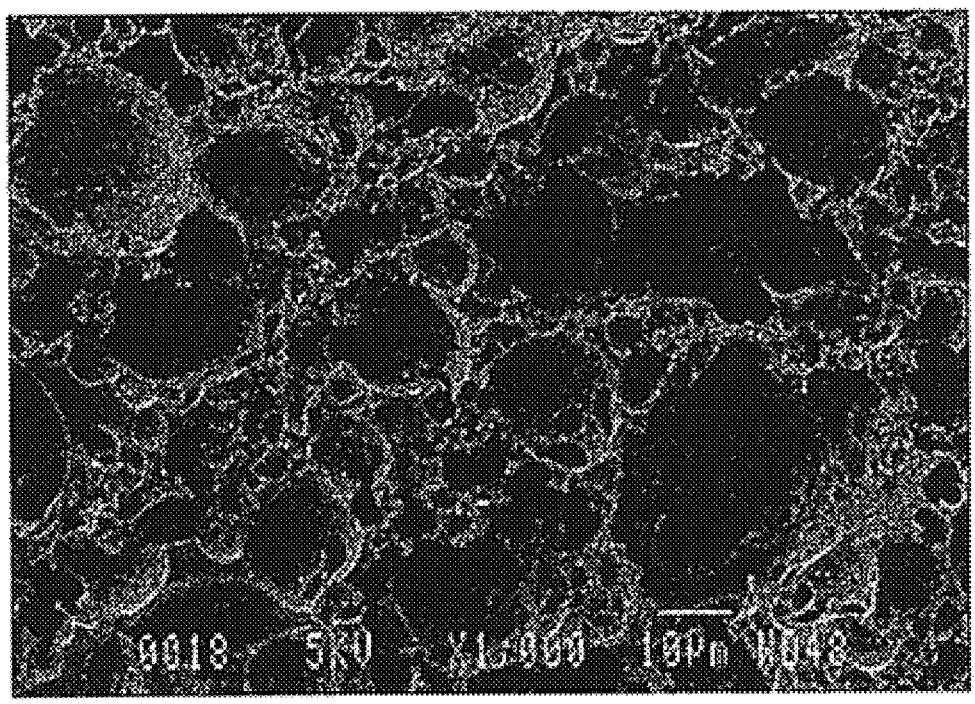
FIG. 3 is a digital image of an electron micrograph of Example 7.

A HIPE foam was prepared as in Example 1 except the alumina dispersion was replaced with a dispersion of potassium cobalt hexocyanoferrate (KCoHex) particles. KCoHex particles having a mean size of approximately 17 microns were media milled to approximately 1–2 microns in a Netzsch Mini-Zeta media mill. The mill was loaded with 720 grams of yttria-stabilized zirconium oxide media and 700 grams of 10 wt % KCoHex in water. The mixture was milled continuously for 45 minutes and then diluted to a 1.25 wt % KCoHex. The KCoHex dispersion was then added to 5.13 grams of the oil phase described in Example 1 at a rate of approximately 2 drops per second. A mixer speed of approximately 450 rpm was used. Upon addition of the dispersion, the oil solution immediately became an opaque violet liquid, and became progressively more viscous as more of the dispersion was added. After the aqueous phase was incorporated, the emulsion was notched-bar coated onto a PET nonwoven (Johns-Mansville) at a total sandwich thickness of 1 mm. To cure the foams, the coated nonwoven was passed six times on full power beneath a 25 cm cross-web illuminating Fusion D bulb, exposing alternate sides with each pass at a line speed of approximately 9.1 meter/min. The foams were then dried at room temperature. After curing and drying, the HIPE foam was 7.34% by weight KCoHex. FIG. 3 shows a SEM micrograph taken of the cross-section of the foam.

Example 8

A HIPE foam was prepared as in Example 1 except alumina particles were not used and the aqueous phase was prepared with 31 grams of deionized water, 0.05 grams of water-soluble photoinitiator (Irgacure 2959, Ciba Specialty Chemicals) and 2.0 grams of dimethylaminoethyl acrylate (DMAEA) quaternized with methyl chloride (Ciba Specialty Chemicals). The aqueous phase was added to 5.13 grams of the oil phase described in Example 1. After curing and drying, the HIPE foam was 1.9% by weight DMAEA.

Figure 4:
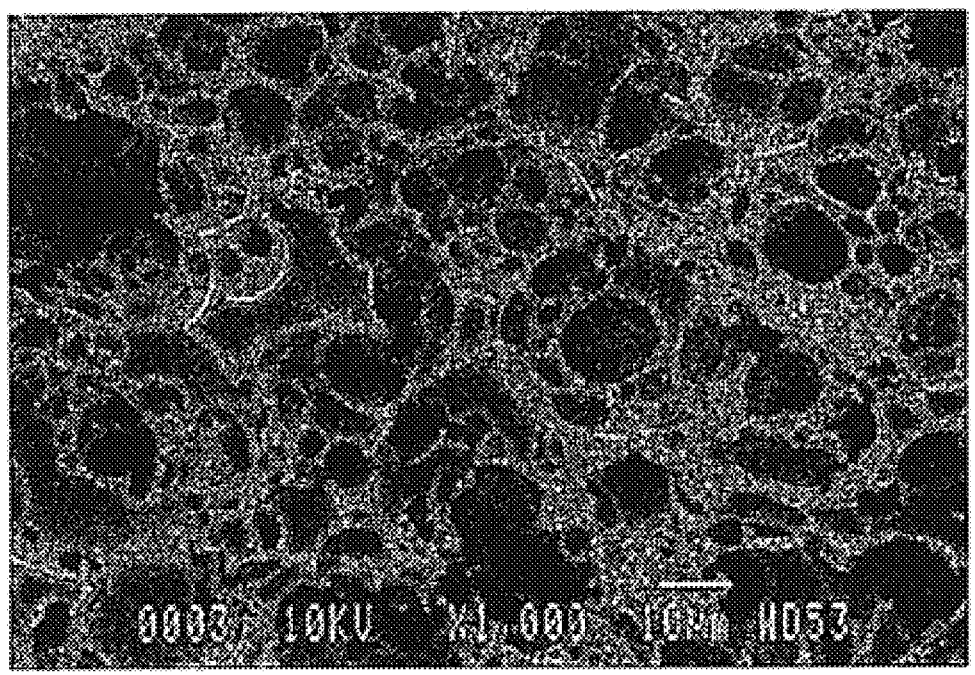
FIG. 4 is a digital image of an electron micrograph of Example 8.

To demonstrate the binding properties of the foam, the foam was placed into a 4 mm diameter column fitted with a retainer ring on top and a porex frit at the bottom for support. 10 microliters of a quarter-strength sequencing reaction mixture was prepared as described in Example 5.5 microliters of the unpurified quarter-strength sequencing reaction mixture (containing dye terminators and their hydrolysis products, DNA template, Taq polymerase, buffer, dNTP's and primer) was centrifuged through the foam at 6000 RPM for 2 minutes. The purified reactions were removed from the column and diluted with 15 microliters of distilled water followed by capillary electrophoresis analysis as described in Example 5 above. The analysis showed that the concentration of the dye terminators, their degradation products, and DNA content, was brought down to less than 2% of the original starting concentration. FIG. 4 shows a SEM micrograph taken of the cross-section of the foam.

Example 9

A HIPE foam was prepared as in Example 1 except alumina particles were not used and the aqueous phase was prepared with 32 grams of deionized water and 0.052 grams of PSSA. The aqueous phase was added to 5.13 grams of the oil phase described in Example 1. After curing and drying, the HIPE foam was 1.0% by weight PSSA.

Example 10

Figure 5:
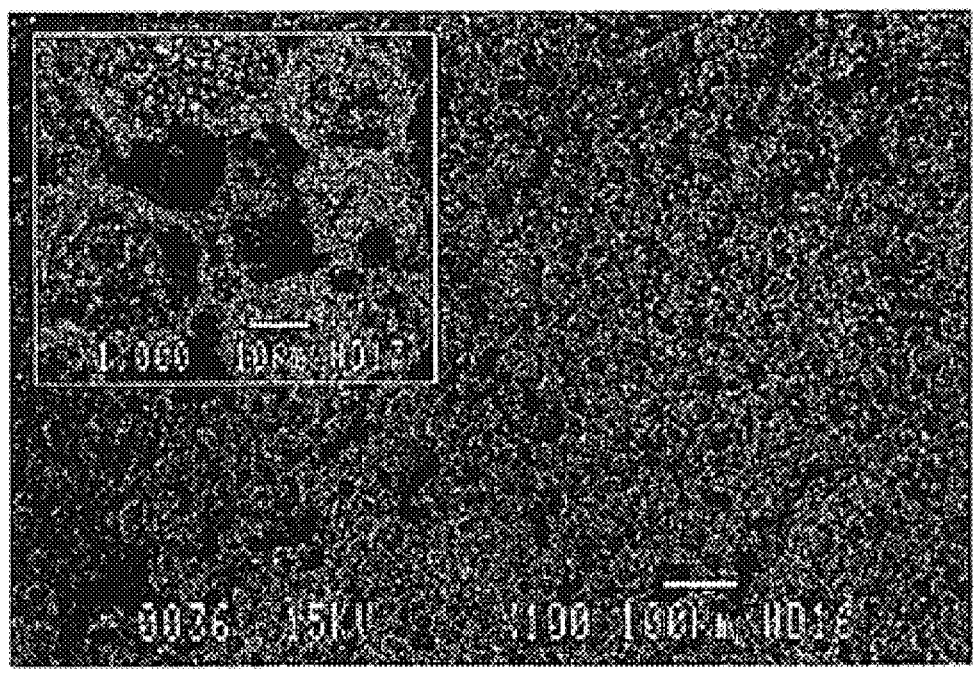
FIG. 5 is a digital image of an electron micrograph of Example 11.

A HIPE foam was prepared as in Example 1 except alumina particles were not used and the oil phase was prepared with 0.51 grams of isobornyl acrylate, 3.34 grams of 2-ethylhexyl acrylate, 0.68 grams of sorbitan monooleate, 0.51 grams of TMPTA and 0.08 grams of Darocur 4265 (Ciba Specialty Chemicals). 28.5 grams of a solution prepared from 31.915 grams of water, 0.57 grams of acrylic acid and 0.01425 grams of Irgacure 2959 (Ciba Specialty Chemicals) was used as the aqueous phase. After curing and drying, the HIPE foam was 8.7% by weight acrylic acid. FIG. 5 shows a SEM micrograph taken of the cross-section of the foam.

Example 11

A HIPE foam was prepared as in Example 1 except 39% by weight alumina was used. The foam was subsequently treated with the sodium salt of polystyrene sulfonic acid (NaPSSA) by soaking the foam overnight in 40 ml of a 0.1 wt % solution of NaPSSA in water. The foam was then washed with water several times to remove any excess PSSA. FIG. 5 shows a SEM micrograph taken of the cross-section of the foam.

To demonstrate the binding properties of the foam, the foam was placed into a 4 mm diameter column fitted with a retainer ring on top and a porex frit at the bottom for support. 20 microliters of unpurified quarter-strength sequencing reaction mixture (containing dye terminators and their hydrolysis products, DNA template, Taq polymerase, buffer, dNTP's and primer) was centrifuged through the foam at 6000 RPM for 2 minutes. The purified reactions were removed from the column and analyzed by capillary electrophoresis as described in Example 5 above. The analysis showed that the dye terminators and its degradation products content was reduced to less than 15% of the original concentration and the DNA content in solution was at least 40% of the starting concentration. The alumina-functionalized HIPE foam that was treated with PSSA scavenged the dye terminators/degradation products while leaving a considerable portion of the DNA sequencing ladders intact.

Example 12

A HIPE foam was prepared as in Example 2 and then placed into a 4 mm diameter column fitted with a retainer ring on top and a porex frit at the bottom for support.

To demonstrate the binding properties of the foam, 5 microliters of unpurified quarter-strength sequencing reaction mixture (containing dye terminators and their hydrolysis products, DNA template, Taq polymerase, buffer, dNTP's and primer) was centrifuged through the foam at 3300 RPM for 2 minutes. The purified reactions were removed from the column, diluted with 15 microliters of distilled water and analyzed by Capillary electrophoresis as described in Example 5 above.

Capillary electrophoresis results showed that the dye terminators and its degradation products content was brought down to less than 2% of the original concentration and the DNA content in solution was also less than 2% of the starting concentration. The PDAMc-treated HIPE foam scavenged both the dye terminators/degradation products as well as the DNA sequencing ladders.

Example 13

The PDAMc-treated HIPE foam (Example 2) was treated subsequently with the sodium salt of polystyrene sulfonic acid (Na PSSA) to allow for increased recovery of DNA sequencing ladders. The foam was passivated by flowing 20 microliters of a 1 wt % aqueous solution of sodium salt of PSSA through the column. This was followed by washing the foam in water to remove excess PSSA. 20 microliters of unpurified sequencing reaction was then applied to the foam and centrifuged at 3300 RPM for 2 minutes. The purified reactions were removed from the column and analyzed by capillary electrophoresis as described above.

Capillary electrophoresis results showed that the dye terminators and its degradation products content was brought down to less than 5% of the original concentration and the DNA content in solution was at least 40% of the starting concentration. The PDAMc-treated HIPE foam that was treated with PSSA scavenged the dye terminators/degradation products while leaving a considerable portion of the DNA sequencing ladders intact.

Example 14

Figure 6:
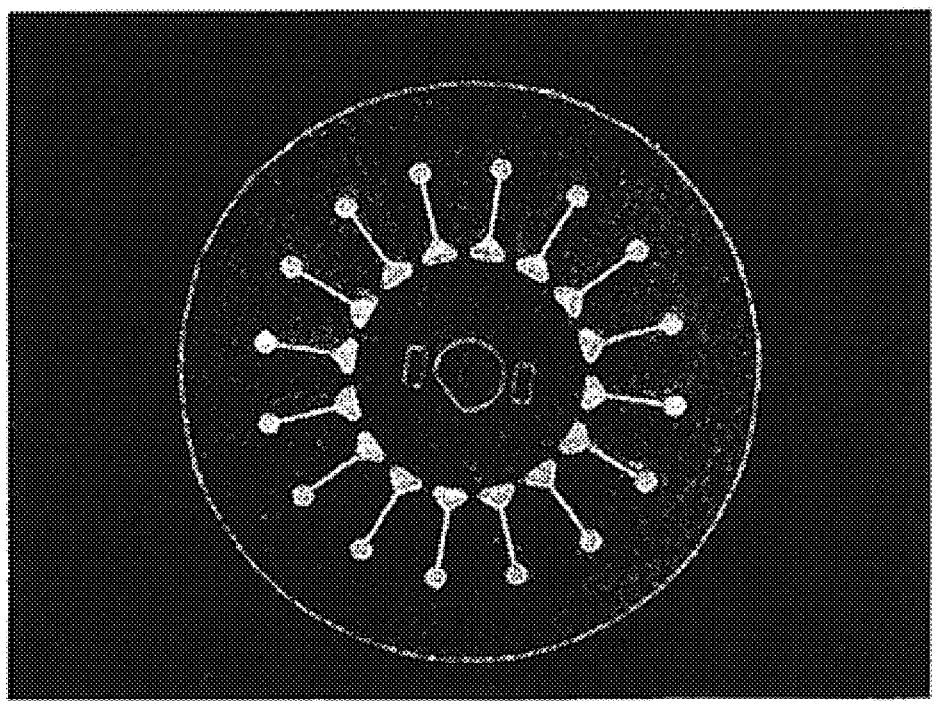
FIG. 6 is a digital image of an optical micrograph of Example 14.
Figure 7:
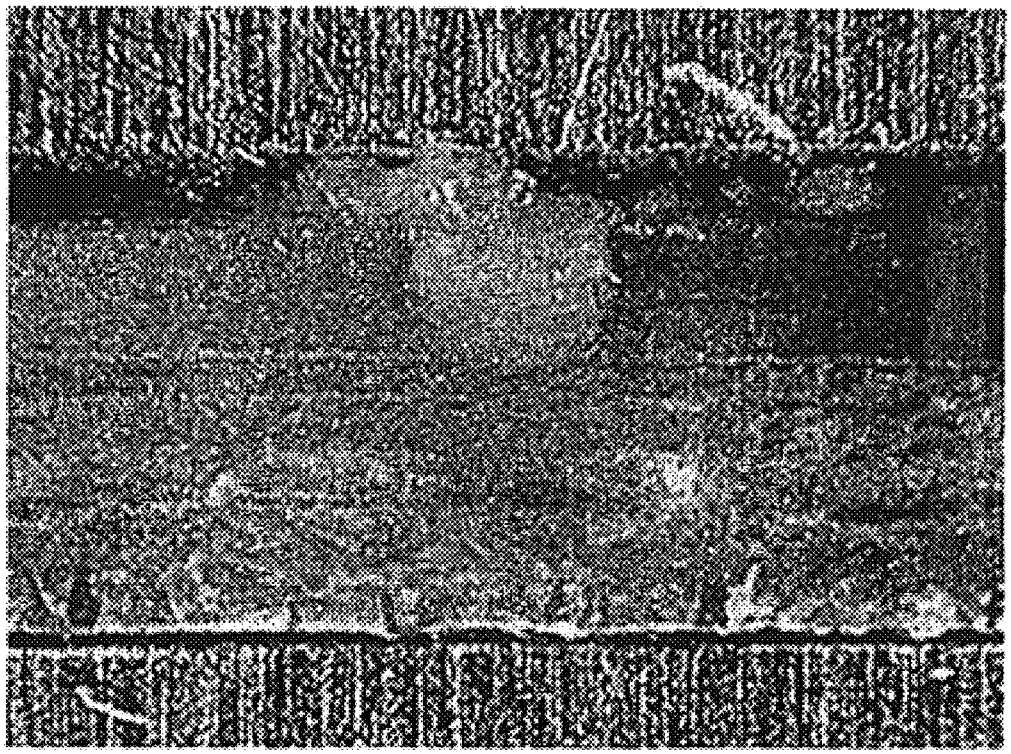
FIG. 7 is a digital image of an optical micrograph of Example 14.

A HIPE foam was prepared as in Example 1 and then coated/filled into the polypropylene channels approximating those in a disposable microfluidic device. The HIPE was injected with a glass syringe equipped with a 20-gauge hypodermic needle into the polypropylene channels. Any excess emulsion was scraped clean with a metal spatula. The disk was placed on an aluminum tray and cured using an ultraviolet Fusion (Gaithersburg, Md.) F600 Irradiator lamp equipped with a D bulb. Three passes were made under the bulb to ensure complete cure. Photo-micrographs of the top view of the microfluidic device and a cross-section of one of the filled channels are shown in FIGS. 6 and 7 respectively.

Example 15

This example demonstrates that the HIPE foams of the present invention can be used to fill the channels of a microfluidic device that have been surface-treated to provide for increased anchorage of the foams to the walls of the channels of the device. The internal surfaces of a 96-well plate were coated with a diamond-like glass (DLG) coating described in PCT publication WO 0166820 (David et al.). The coated wells were immersed in a 95% ethanol—5% (v/v) water solution, that was adjusted to pH 4.5–5.5 by addition of acetic acid, along with 2 ml of 3-acryloxypropyltrimethoxysilane (CAS#4369-14-6, United Chemical Technologies, Inc., Bristol, Pa.). The wells were kept immersed in the solution for 12 hours and then kept at 110° C. for 10 minutes. A HIPE foam was prepared as in Example 1 and then coated/filled into the polypropylene wells. The HIPE was injected with a glass syringe equipped with a 20-gauge hypodermic needle into the polypropylene channels. Any excess emulsion was scraped clean with a metal spatula. The plate was placed on an aluminum tray and cured using an ultraviolet Fusion (Gaithersburg, Md.) F600 Irradiator lamp equipped with a D bulb. Three passes were made under the bulb to ensure complete cure. The diamond-like glass (DLG) coating enabled binding to the foam to the substrate.

What is claimed is:

1. A process for preparing a foam article comprising mixing
   a) a continuous oil phase comprising at least one ethylenically unsaturated monomer, and
   b) a co-continuous or discontinuous aqueous phase comprising:
      1) a polyelectrolyte having pendent ionic or ionizable functional groups, or
      2) a polymerizable monomer having ionic or ionizable functional groups; to prepare a high internal phase emulsion; and
   c) exposing said emulsion to actinic radiation in the presence of an initiator to polymerize said monomer(s) and form a polymeric foam having a co-continuous or discontinuous aqueous phase containing polyelectrolyte.

2. The process of claim 1 wherein said emulsion is shaped prior to said polymerization step c).

3. The process of claim 2 wherein said emulsion is shaped by coating and curing on a shaped substrate.

4. The process of claim 3 wherein said shaped substrate is in the form of a column, multi-well plate, probe tip, membrane, card, thin layer chromatography, dead end well deposited bead, or microfluidic medium.

5. The process of claim 3, wherein said substrate is surface treated prior to coating and curing.

6. The process of claim 5 wherein said surface treatment is selected from oxidation, ozonation, sulfonation, amination, plasma treatment, corona treatment, flame treatment; $SiO_2$ deposition, followed by acid or base treatment; chemical oxidation and silanization.

7. The process of claim 5 wherein said surface treatment is deposition of a diamond-like glass film, followed by oxygen plasma treatment.

8. The process of claim 1 wherein said aqueous phase further comprises a water-soluble photoinitiator.

9. The process of claim 1, wherein said emulsion further comprises a crosslinking agent in said oil phase.

10. The process of claim 9, wherein said crosslinking agent is selected from divinyl benzene, ethylene glycol di(methyl)acrylate, trimethylolpropane triacrylate and allyl (meth)acrylate.

11. The process of claim 1 wherein said polyelectrolyte having pendent ionic functional groups comprises a styrene sulfonic acid homo- or copolymer.

12. The process of claim 1 wherein said oil phase further comprises an emulsifier.

13. The process of claim 1, wherein said polyelectrolyte of said co- or discontinuous phase comprises 1 to 10 weight percent of said emulsion.

14. The process of claim 1 wherein said continuous oil phase comprises 5 to 25 weight % of said ethylenically unsaturated monomer.

15. The process of claim 1 wherein said polyeletrolyte comprises homo- and copolymers of: (meth)acrylic acid, acrylamido-alkanesulfonic acid, sulfoalkyl (meth)acrylate, maleic anhydride, itaconic anhydride, β-carboxyalkylacrylate, vinylazlactone-glycolic acid adduct, styrene sulfonate, and salts or combinations thereof.

16. The process of claim 1 wherein said polymerizable monomer having ionic or ionizable functional groups is selected from: sulfopropyl acrylate, maleic anhydride, itaconic anhydride, β-carboxy ethylacrylate, vinylazlactone-glycolic acid adduct, styrene sulfonate, acrylic acid, methacrylic acid, dimethylaminoethyl acrylate, 2-acrylamido-2-methylpropane sulfonate, 4,4,9-trimethyl-4-azo-7-oxa-dec-9-ene-1-sulfonate, N,N-dialkyl-N-beta-methacryloxyethyl) propionate betaine, trialkylamine(meth)acrylamide, 1,1-dialkyl-1-(2,3-dihydroxypropyl)amino methacrylamide, 2-acyrlamido-2-methylpropane sulfonate, and salts and mixtures thereof.

17. The process of claim 1 wherein said polyelectrolyte is coated on the surface of the cells of said resulting polymeric foam.

18. The process of claim 1 wherein said polyelectrolyte forms discrete domains in the cells of said resulting polymeric foam.

19. The process of claim 1 wherein said resulting foam is a continuous, open-cell foam of less than 100 μm cell size, and greater than 0 to 100 intercellular windows per foam cell, and a polyelectrolyte within the foam cells.

* * * * *

UNITED STATES PATENT AND TRADEMARK OFFICE
CERTIFICATE OF CORRECTION

| | |
|---|---|
| PATENT NO. | : 6,750,261 B1 |
| APPLICATION NO. | : 10/409378 |
| DATED | : June 15, 2004 |
| INVENTOR(S) | : Susannah C. Clear |

It is certified that error appears in the above-identified patent and that said Letters Patent is hereby corrected as shown below:

Title page,
Item [56], References Cited, OTHER PUBLICATIONS, delete "pp. 821-826" and insert -- pp. 821-828 --, therefor; and delete "vol. 88" and insert -- vol. 68 --, therefor.

Column 1,
Line 27, delete "01121693" and insert -- 01/21693 --, therefor.

Column 2,
Line 6, delete "open-coiled" and insert -- open-celled --, therefor.

Column 7,
Line 4, delete "sulfonyidiethanol" and insert -- sulfonyldiethanol --, therefor.
Line 6, delete "propylcne" and insert -- propyiene --, therefor.

Column 8,
Line 27, delete "nionomer(s)" and insert -- monomer(s) --, therefor.
Line 49, delete "includethose" and insert -- include those --, therefor Column 11,
Line 52, delete "some,emulsions" insert -- some emulsions --, therefor.

Column 14,
Line 5, after "foam", delete ".".

Column 15,
Line 63, delete "HMPE-based" and insert -- HIPE-based --, therefor.
Line 66, delete "arid" and insert -- and --, therefor.

Column 17,
Line 36-37, delete "101027,222" and insert -- 10/027,222 --, therefor.

Column 19,
Line 36, delete "Fairbum" and insert -- Fairburn --, therefor.

UNITED STATES PATENT AND TRADEMARK OFFICE
CERTIFICATE OF CORRECTION

PATENT NO. : 6,750,261 B1
APPLICATION NO. : 10/409378
DATED : June 15, 2004
INVENTOR(S) : Susannah C. Clear It is certified that error appears in the above-identified patent and that said Letters Patent is hereby corrected as shown below:

Column 24,
Line 19, in claim 15, delete "polyeletrolyte" and insert -- polyelectrolyte --, therefor.

Signed and Sealed this

Sixteenth Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,750,261 B1 | Page 1 of 1 |
| APPLICATION NO. | : 10/409378 | |
| DATED | : June 15, 2004 | |
| INVENTOR(S) | : Susannah C. Clear et al. | |

It is certified that error appears in the above-identified patent and that said Letters Patent is hereby corrected as shown below:

Column 7,

Line 6, delete "propylcne" and insert -- propylene --, therefor.

Signed and Sealed this

Thirtieth Day of December, 2008

JON W. DUDAS
*Director of the United States Patent and Trademark Office*